US012737194B2

(12) United States Patent
Allin et al.

(10) Patent No.: US 12,737,194 B2
(45) **Date of Patent: *Sep. 15, 2026**

(54) GENERATING AN APPLICATION PROGRAMMING INTERFACE REQUEST USING SETS OF INTERACTION DATA

(71) Applicant: Truist Bank, Charlotte, NC (US)

(72) Inventors: Louis Allin, Richmond, VA (US); Jonathan Topp, Montpelier, VA (US); Omganesh Teekaramsingh, Johns Creek, GA (US); Lenin Kumar Pagidipala, Atlanta, GA (US)

(73) Assignee: Truist Bank, Charlotte, NC (US)

( * ) Notice: Subject to any disclaimer, the term of this patent is extended or adjusted under 35 U.S.C. 154(b) by 79 days.

This patent is subject to a terminal disclaimer.

(21) Appl. No.: 18/753,173

(22) Filed: Jun. 25, 2024

(65) Prior Publication Data

US 2024/0345850 A1 Oct. 17, 2024

Related U.S. Application Data

(63) Continuation of application No. 18/074,147, filed on Dec. 2, 2022, now Pat. No. 12,045,632.

(51) Int. Cl.

| | |
|---|---|
| ***G06F 9/44*** | (2018.01) |
| ***G06F 8/60*** | (2018.01) |
| ***G06F 9/445*** | (2018.01) |

(52) U.S. Cl.
CPC ............ *G06F 9/44505* (2013.01); *G06F 8/60* (2013.01)

(58) Field of Classification Search
CPC ................................ G06F 9/4405; G06F 8/60
See application file for complete search history.

(56) References Cited

U.S. PATENT DOCUMENTS

| | | | | |
|---|---|---|---|---|
| 10,402,790 | B1 * | 9/2019 | Clark | G06Q 20/0425 |
| 2021/0297621 | A1 * | 9/2021 | Shirai | H04N 25/61 |

* cited by examiner

*Primary Examiner* — Keshab R Pandey
(74) *Attorney, Agent, or Firm* — Kilpatrick Townsend & Stockton LLP; Michael A. Springs, Esq.

(57) ABSTRACT

A computing system can receive, from a mobile application executing on a mobile device, at least one image that has been captured on the mobile device and corresponds to an interaction. The computing system can extract interaction data from each image. The computing system can transmit an application programming interface request to an entity server that is configured to cause the entity server to process the plurality of interactions and receive a confirmation from the entity server that the plurality of interactions have been processed.

17 Claims, 7 Drawing Sheets

GENERATING AN APPLICATION PROGRAMMING INTERFACE REQUEST USING SETS OF INTERACTION DATA

This application is a continuation of U.S. patent application Ser. No. 18/074,147, filed Dec. 2, 2022, titled "GENERATING AN APPLICATION PROGRAMMING INTERFACE REQUEST USING SETS OF INTERACTION DATA", the entirety of which is incorporated herein by reference.

TECHNICAL FIELD

The present disclosure relates generally to processing data. More specifically, but not exclusively, certain aspects of the present disclosure relate to generating an application programming interface request based on sets of interaction data.

BACKGROUND

In some cases, a user can initiate an interaction with an entity via a digital or non-digital interaction channel. In some cases, the interaction may be a deposit. The interaction can be processed by an entity server that can fulfill the interaction. In some cases, processing interactions individually can involve consuming a significant amount of computing resources and network bandwidth.

SUMMARY

In some examples, a computing system can receive, from a mobile application executing on a mobile device, at least one image that has been captured on the mobile device and corresponds to an interaction. The computing system can extract interaction data from each image. The computing system can transmit an application programming interface request to the entity server for causing the entity server to process the interactions and receive a confirmation from the entity server that the plurality of interactions have been processed.

In some examples, a method can involve receiving, by at least one processor and from a mobile application executing on a mobile device, at least one image that has been captured on the mobile device and corresponds to an interaction. The method can involve extracting, by the at least one processor, interaction data from each image. The method can involve transmitting, by the at least one processor, an application programming interface request to the entity server and receiving a confirmation from the entity server that the plurality of interactions have been processed.

In some examples, a non-transitory computer-readable can include instructions executable for causing at least one processor to receive, from a mobile application executing on a mobile device, at least one image that has been captured on the mobile device and corresponds to an interaction. The instructions can be further executable for causing the at least one processor to extract interaction data from each image. The instructions can be further executable for causing the at least one processor to transmit an application programming interface request to the entity server for causing the entity server to process the interactions and receive a confirmation from the entity server that the plurality of interactions have been processed.

DETAILED DESCRIPTION

Figure 1:
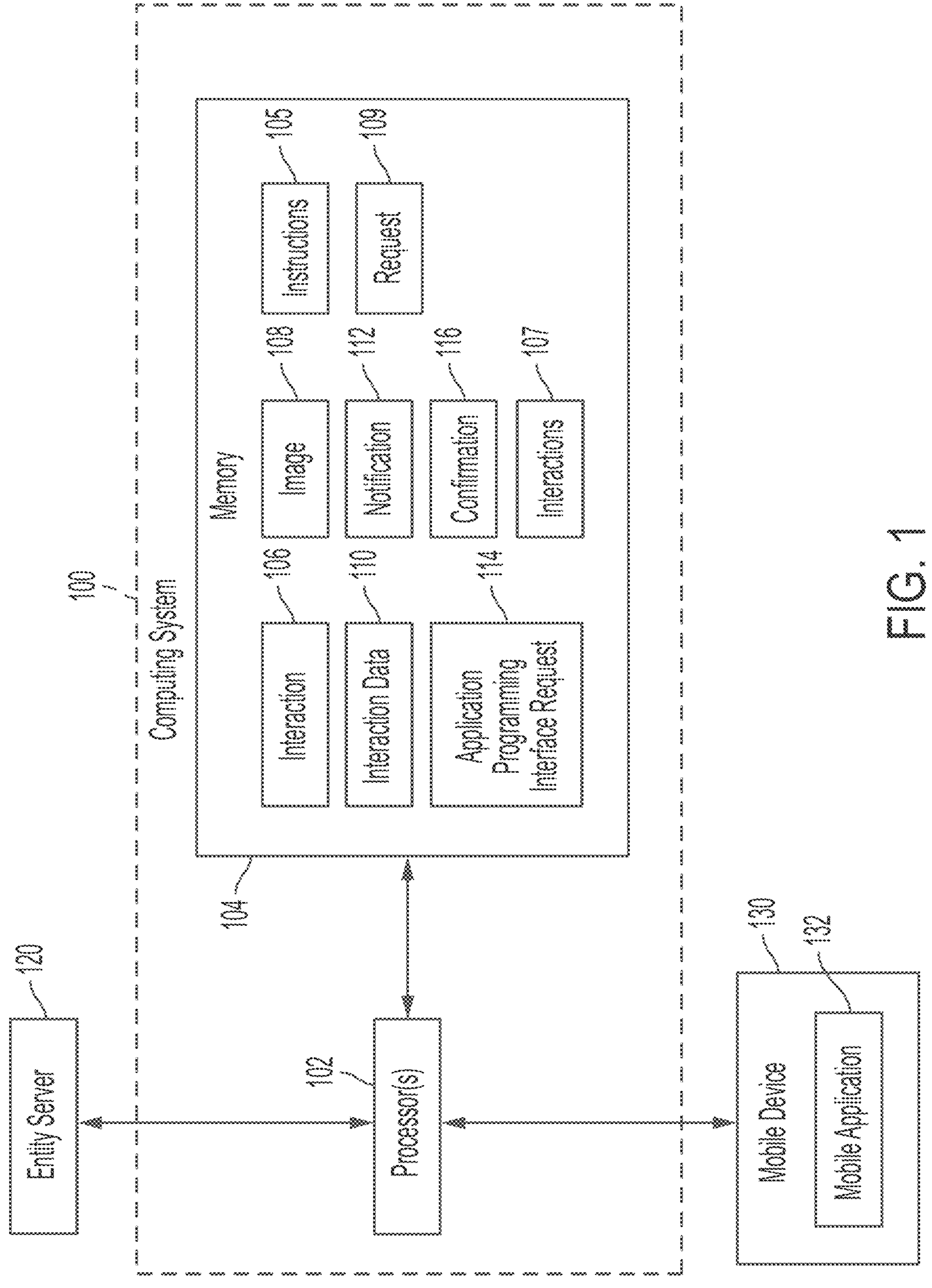
FIG. 1 is an illustration of a computing system for generating an application programming interface request based on sets of interaction data according to some examples of the present disclosure.

Certain aspects and features relate to generating an application programming interface request based on sets of interaction data. It may be desirable to group interaction data in batches for processing rather than processing each set of interaction data individually. Enabling an entity server to process the interaction data in batches can increase a speed at which the interactions are processed and fulfilled. In some examples, enabling the entity server to process the interaction data in batches can reduce an amount of computing resources consumed by the entity server (e.g. storage space, network bandwidth, etc.) and by a computing system handling the interactions by decreasing a number of requests sent to the entity server.

Prior to generating the application programming interface request, a computing system, such as a computing cluster, server, or network of servers, can receive at least one image that corresponds to each interaction. For example, the computing system can receive a first set of images that correspond to a first interaction, and a second set of images that correspond to a second interaction, and so on. The computing system can receive the at least one image from a mobile application that is executing on a device. In some examples, the mobile device may have captured the at least one image via an input peripheral, such as a camera or scanner device. The at least one image can include a first image depicting a front side of a document and a second image depicting a rear side of a document. In some examples, the document can be a check.

The computing system can transmit the interaction data to the server, a computing system can generate an application programming interface request based on sets of interaction data corresponding to a batch of interactions. The computing system can extract interaction data from each set of images. In some examples, the computing system can transmit the images for each interaction to a server within the computing system (or, in some examples, external to the computing system) that can process the images and extract the relevant interaction data from the images. Once the images have been processed, the computing system can transmit a notification to the mobile device for indicating to a user of the mobile device that the interaction data has been successfully extracted from the images. In the event that an error occurs while extracting the images, the computing system can instead transmit an error message indicating that an error has occurred while attempting to extract the interaction data from the images.

The computing system can receive a request to transmit the interactions to an entity server for processing. The computing system can generate, based on the interaction data for each interaction, an application programming interface request that can cause the entity server to process the interactions. The application programming interface request can include a set of interaction data corresponding to each interaction in the set of interactions. The computing system can add sets of interaction data to the application programming interface request until the number of interactions represented in the application programming interface request matches a pre-defined number of interactions. In some examples, the application programming interface request can include a file corresponding to each interaction. The file can include a front-facing image of a document corresponding to the interaction, a rear-facing image of the document corresponding to the interaction, and metadata associated with the interaction and the front-facing and rear-facing images.

The computing system can transmit the application programming interface request to the entity server. The entity server can, in response to receiving the application programming interface request, process the set of interactions in the application programming interface request. Finally, the computing system can receive a confirmation from the entity server that the interactions have been processed by the entity server.

In the following description, for the purposes of explanation, specific details are set forth in order to provide a thorough understanding of various implementations and examples. Various implementations may be practiced without these specific details. For example, circuits, systems, algorithms, structures, techniques, networks, processes, and other components may be shown as components in block diagram form in order not to obscure the implementations in unnecessary detail. The figures and description are not intended to be restrictive.

FIG. 1 is an illustration of a computing system 100 for generating an application programming interface request 114 based on sets of interaction data 110 according to some examples of the present disclosure. The computing system 100 can include one or more processors 102 that can be communicatively coupled to a memory 104. Examples of the processor 102 include a Field-Programmable Gate Array (FPGA), an application-specific integrated circuit (ASIC), and a microprocessor. The processor 102 can execute instructions 105 stored in the memory 104 to perform one or more operations. In some examples, the instructions 105 can include processor-specific instructions generated by a compiler or an interpreter from code written in any suitable computer-programming language, such as C, C++, C#, and Java.

The memory 104 can include one memory device or multiple memory devices. The memory 104 can be volatile or non-volatile, in that the memory 104 can retain stored information when powered off. Examples of the memory 104 include electrically erasable and programmable read-only memory (EEPROM), flash memory, or any other type of non-volatile memory. At least a portion of the memory device includes a non-transitory computer-readable medium. A computer-readable medium can include electronic, optical, magnetic, or other storage devices capable of providing the processor 102 with the instructions 105 or other program code. Non-limiting examples of a computer-readable medium include magnetic disks, memory chips, ROM, random-access memory (RAM), an ASIC, a configured processor, optical storage, or any other medium from which a computer processor can read the instructions 105.

The computing system 100 can receive at least one image 108 that corresponds to each interaction 106 in a set of interactions 107 that are to be processed by the entity server 120. The computing system 100 can receive the at least one image 108 from a mobile application 132 that can execute on a mobile device 130. In some examples, the mobile application 132 may be a mobile banking application, and the interactions 107 can be deposits. In some examples, the mobile device 130 can include one or more input peripherals, such as a camera or a scanner device that can be used for retrieving the interaction data 110 from a document. The at least one image 108 can include a first image 108 of a front side of a document that has been scanned by the mobile device 130 and a second image 108 of a rear side of the document that has been scanned by the mobile device 130. In some examples, the document can be a check or any other suitable document having interaction data 110 thereon.

The computing system 100 can transmit the interaction data 110 to the entity server 120 via an application programming interface request 114. For example, the computing system 100 can generate an application programming interface request 114 based on sets of interaction data 110 corresponding to a batch of interactions 107. The computing system 100 can extract interaction data 110 from each set of images 108. In some examples, the computing system 100 can transmit the images 108 for each interaction to a server within the computing system 100 that can process the images 108 and extract the relevant interaction data 110 from the images. The computing system 100 can transmit a notification 112 to the mobile device 130 for indicating to a user of the mobile device that the interaction data 110 has been extracted from the images 108. In some examples, extracting the interaction data 110 from the image 108 can involve retrieving magnetic ink character recognition (MICR) data from a region of the image 108. Each set of magnetic ink character recognition data may be usable by the entity server 120 or the computing system 100 for validating a corresponding interaction 106. In the event that an error occurs while extracting the images 108, the computing system can instead transmit an error message indicating that an error has occurred while attempting to extract the interaction data 110 from the images 108.

The computing system 100 can receive a request 109 to transmit the interactions 106 to the entity server 120 for processing. The entity server 120 can be managed by a clearing house or other suitable entity for processing interactions 106. The computing system 100 can generate, based on the interaction data 110 for each interaction 106, an application programming interface request 114 that can cause the entity server 120 to process the set of interactions 107. The application programming interface request 114 can include a set of interaction data corresponding to each interaction 106 in the set of interactions 107. The computing system 100 can add sets of interaction data to the application programming interface request 114 until the number of interactions represented in the application programming interface request 114 matches a pre-defined number of interactions 106. In an illustrative example, it may be desirable to process the interactions 106 in groups of twelve. In the example, the computing system 100 can add twelve sets of interaction data 110 corresponding to twelve interactions prior to generating the application programming interface request 114. In some examples, the computing system 100 can include internal logic for ensuring that the number of interactions 106 in the set of interactions 107 matches an expected amount of interactions 106, and that a set of values associated with the set of interactions 107 matches a set of expected values associated with the interactions 106.

In some examples, the application programming interface request 114 can include a file corresponding to each interaction 107, such as an X9 file or any other suitable file for transmitting interaction data 110. The file can include a front-facing image 108 of a document corresponding to the interaction, a rear-facing image 108 of the document corresponding to the interaction, and metadata associated with the interaction 106 and the front-facing and rear-facing images 108. For example, the file can include metadata corresponding to a resolution of the images 108, a file compression of the images 108, or any other suitable data associated with the images 108.

The computing system 100 can transmit the application programming interface request 114 to the entity server. The entity server 120 can, in response to receiving the application programming interface request 114, process the set of interactions 107 represented in the application programming interface request 114 as interaction data 110. The computing system 100 can receive a confirmation 116 from the entity server 120 that the set of interactions 107 have been processed by the entity server 120. Receiving the confirmation 116 can include receiving a set of interaction identifiers corresponding to the set of interactions 107. For example, each interaction identifier can correspond to a unique interaction 106. The interaction identifiers can be generated by the entity server 120 in response to processing a corresponding interaction 106. In some examples, the computing system 100 can generate a record for each interaction 106 that can associate each interaction 106 with a user account corresponding to a user of the mobile device 130.

Figure 2:
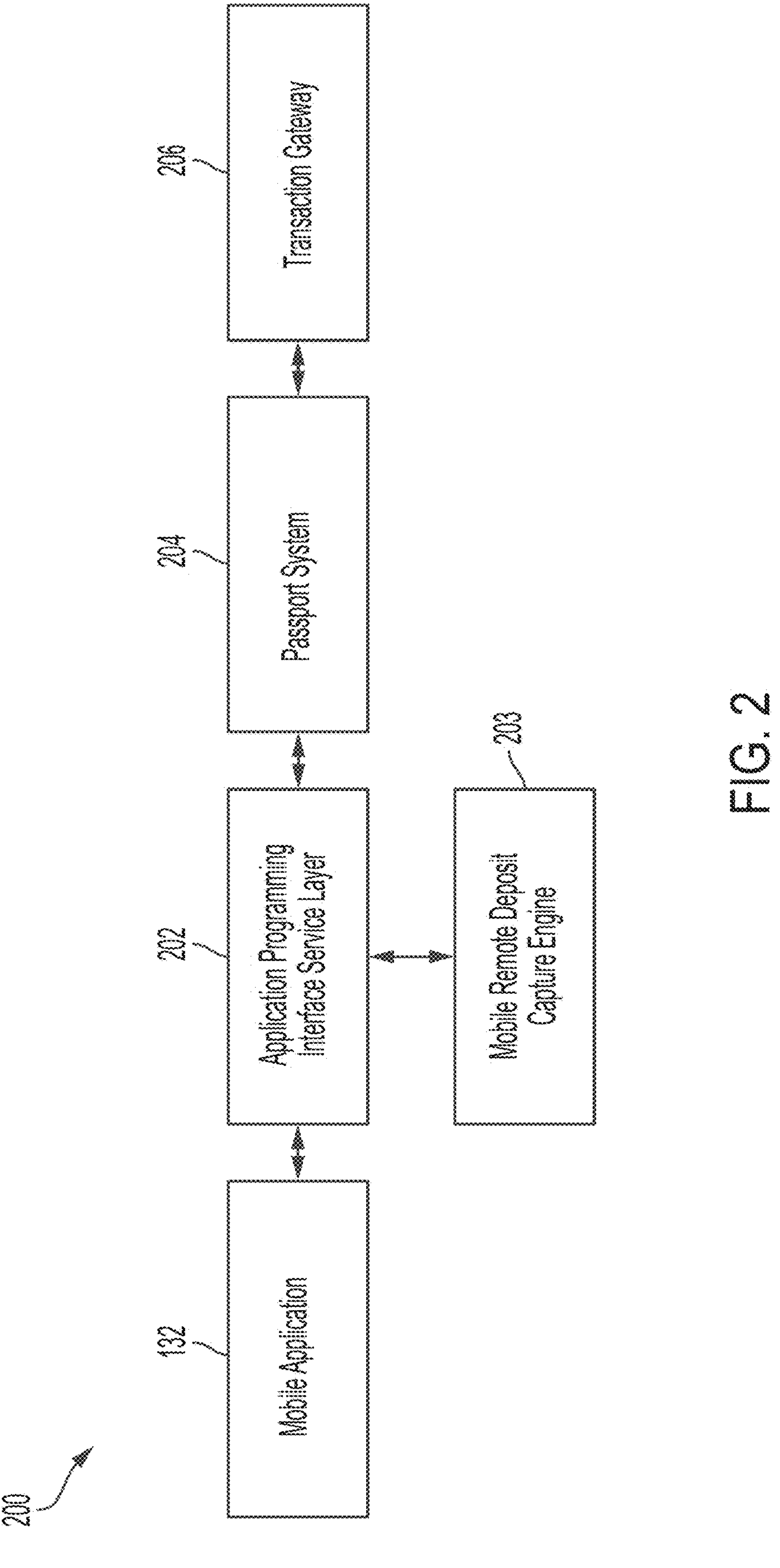
FIG. 2 is an illustration of a computing environment for generating an application programming interface request based on sets of interaction data according to some examples of the present disclosure.

FIG. 2 is an illustration of a computing environment 200 for generating an application programming interface request based on sets of interaction data according to some examples of the present disclosure. The computing environment 200 can include a mobile application 132 that can execute on the mobile device 130 described in FIG. 1. The mobile application 130 can be communicatively coupled to an application programming interface service layer 202 that can receive requests 109 and interaction data 110 from the mobile application 132. The application programming interface service layer 202 can be communicatively coupled with a mobile remote deposit capture engine 203. In some examples, the application programming interface service layer 202 can execute on the same server as the mobile remote deposit capture engine 203. The application interface service layer 202 and the mobile remote deposit capture engine 203 can execute on the computing system 100 described in FIG. 1. The application programming interface service layer 202 can be communicatively coupled to a passport system 204 and can transmit interaction data 110 to the passport system 204. The application programming interface service layer 202 can build an application programming interface request based on the interaction data and transmit the application programming interface request to a passport system. The passport system 204 can transmit the interaction data 110 to a transaction gateway 206. The transaction gateway 206 can transmit the interaction data 110 to an entity server for processing.

Figure 3A:
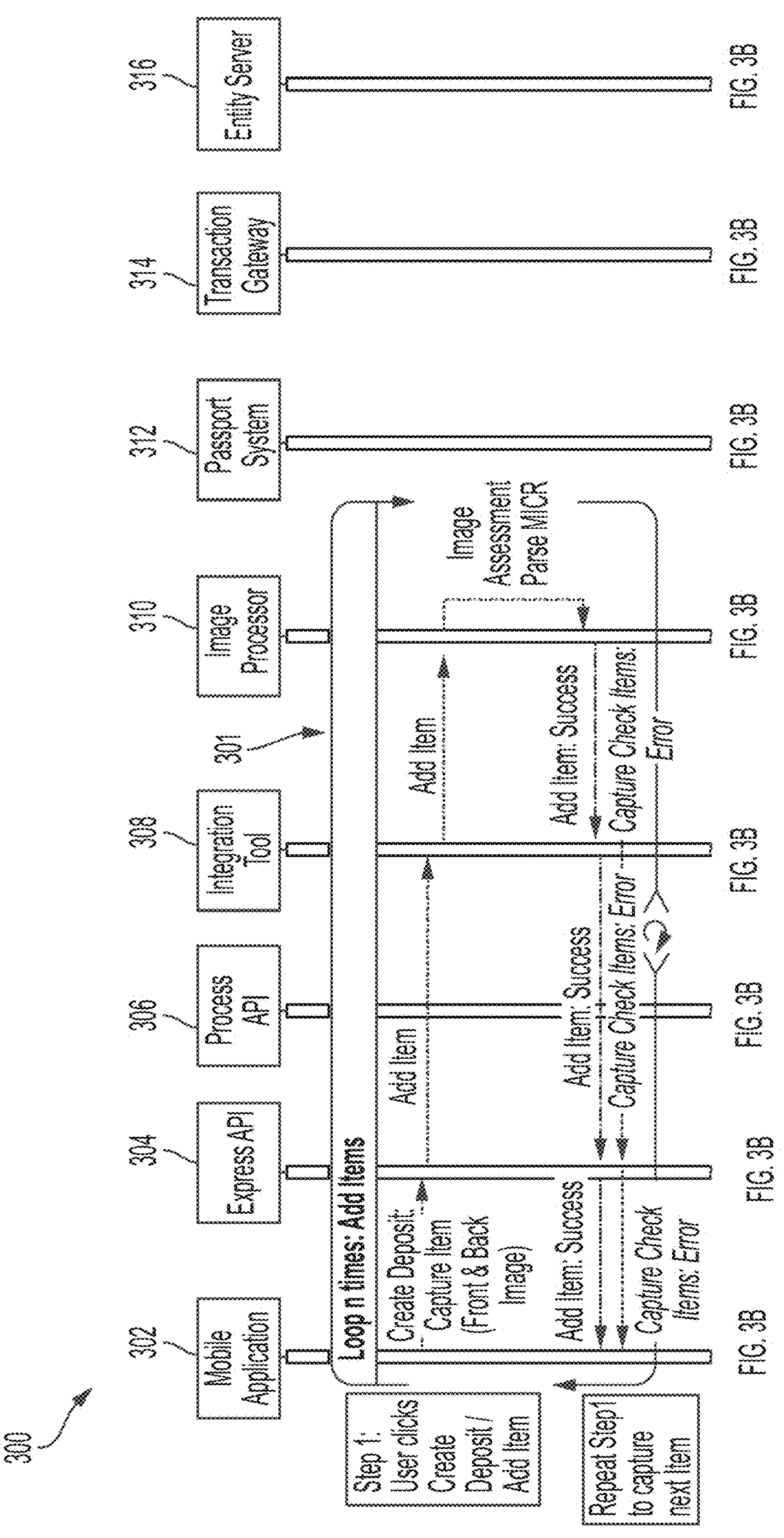
FIGS. 3A and 3B are illustrations of a workflow for generating an application programming interface request based on sets of interaction data according to some examples of the present disclosure.
Figure 3B:
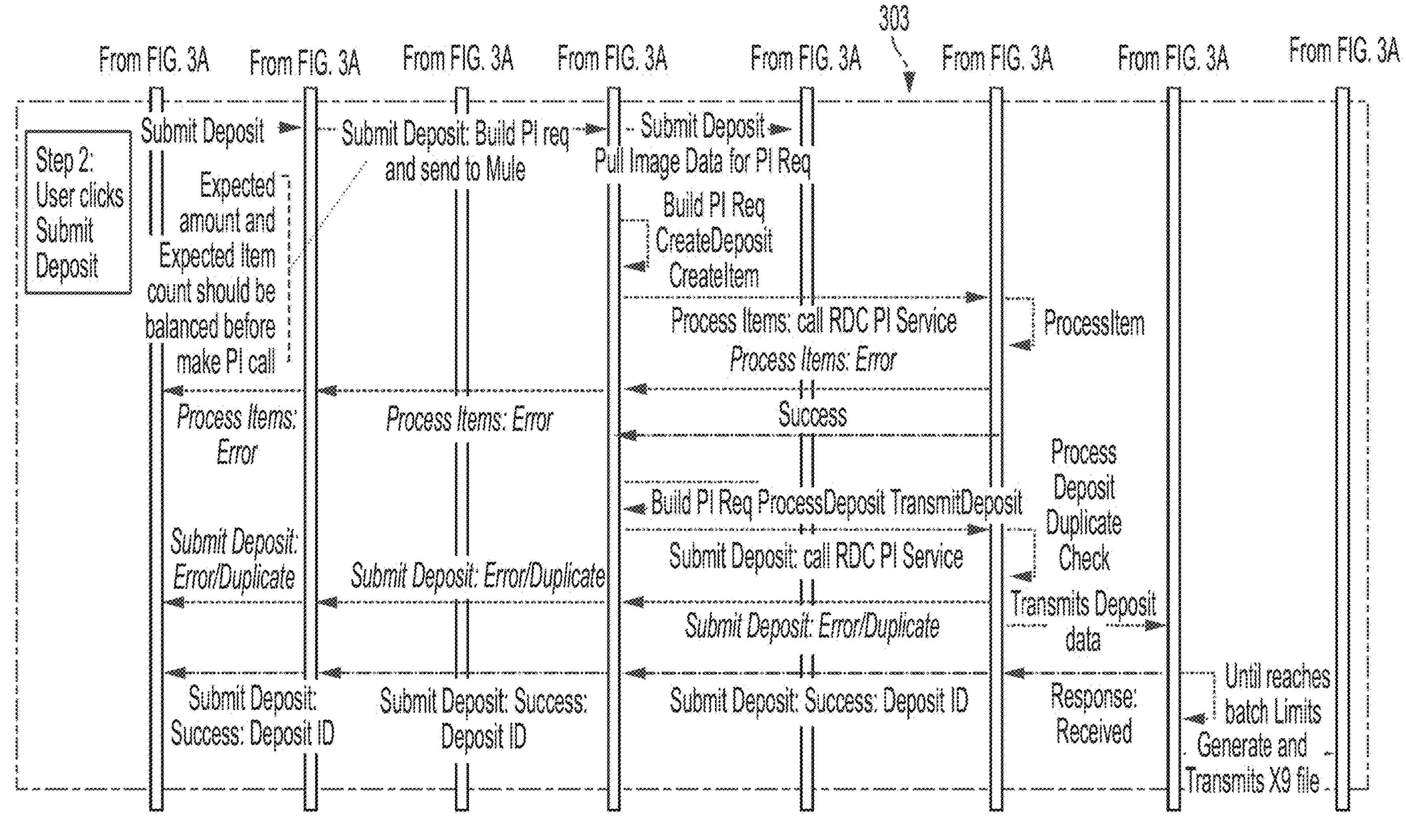

FIGS. 3A and 3B are illustrations of a workflow 300 for generating an application programming interface request based on sets of interaction data according to some examples of the present disclosure. In FIG. 3A, the workflow 300 can involve an iterative process 301 that can involve receiving images 108 from a mobile application 302 and retrieving image data from the images 108. For example, for each interaction, a mobile application 302 can transmit at least one image 108 to an express application programming interface 304, the at least one image corresponding to a front of a document and a back of a document. The express application programming interface 304 can transmit the image(s) 108 to an integration tool 308 that can create a record therefrom. The integration tool 308 can transmit the image(s) 108 to an image processor 310 that can extract interaction data from the image(s) 108. The image processor 310 can transmit a notification to the integration tool that the interaction data 110 has been successfully extracted from the image(s) 108. This iterative process can be repeated for each interaction 106 until the interaction data 110 corresponding to each interaction 106 has been captured.

Referring now to FIG. 3B, the workflow 300 can include a non-iterative process that can involve submitting each set of interaction data 110 to the entity server 316 for processing. The mobile application 302 can transmit a request to the integration tool 308 for retrieving the interaction data from the image processor 310. The integration tool 308 can retrieve the interaction data from the image processor 310 and build an application programming interface request from the interaction data 110 and transmit the application programming interface request to the passport system 312. The passport system 312 can process the application programming interface request and transmit the interaction data to the transaction gateway 314. The transaction gateway 314 can generate a file based on the interaction data 110 and transmit the file to the entity server 316. In some examples, generating the file can include adding sets of interaction data 110 to the file until a pre-defined batch size is reached. In response to the entity server 316 processing the interaction data 110 in the file, the transaction gateway can transmit a notification to the mobile application indicating that the interaction data 110 for the set of interactions has been processed by the entity server 316.

Figure 4A:
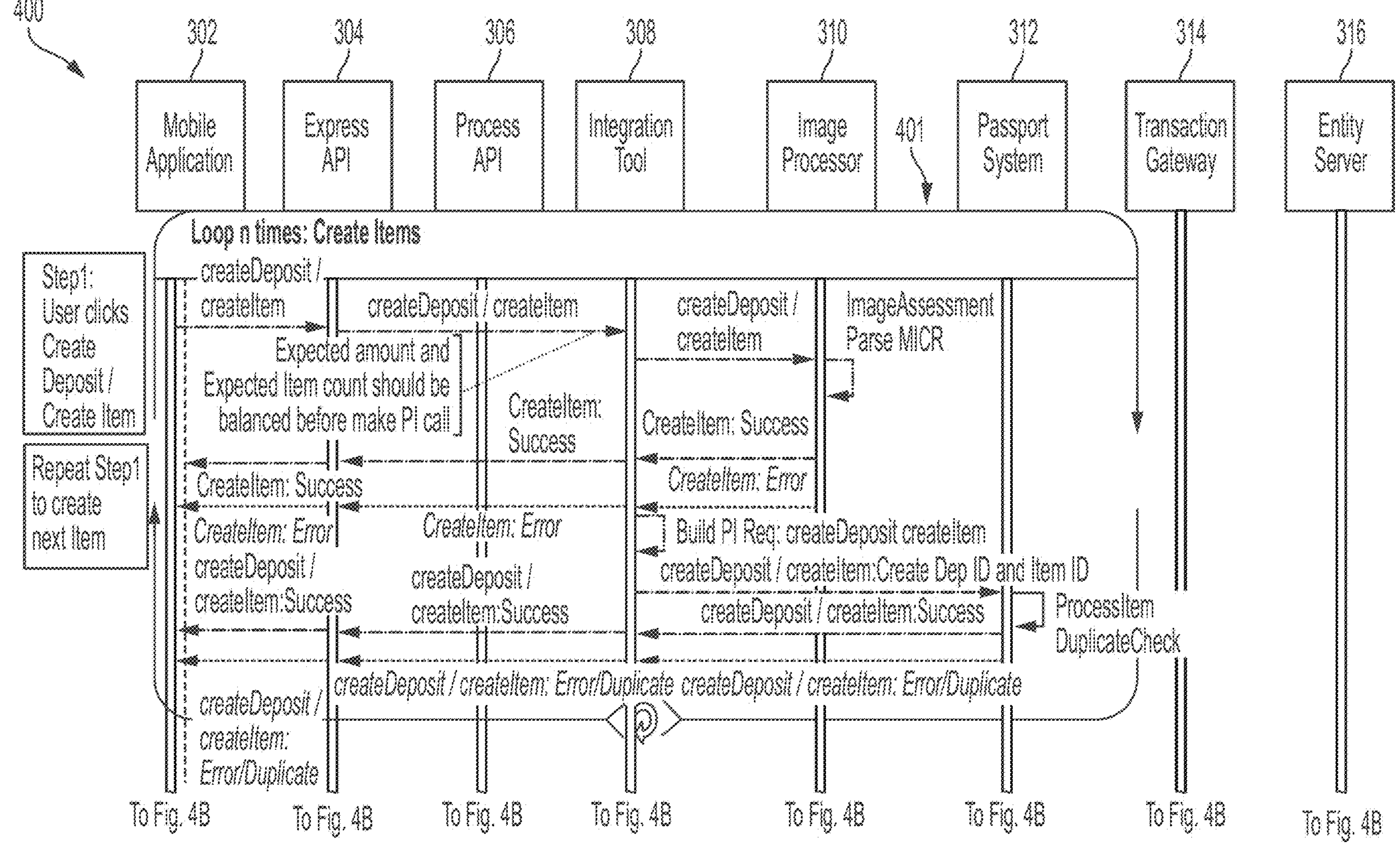
FIGS. 4A and 4B are illustrations of a workflow for generating an application programming interface request based on sets of interaction data according to some examples of the present disclosure.
Figure 4B:
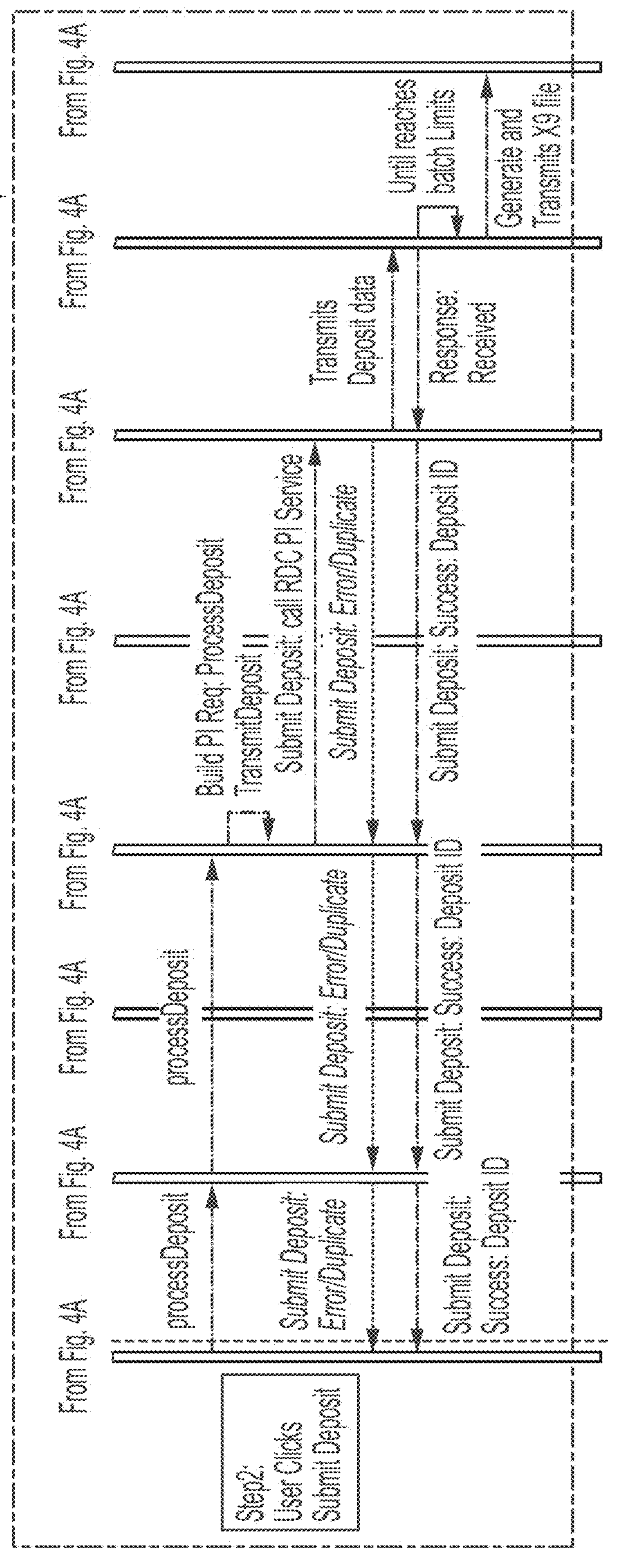

FIGS. 4A and 4B are illustrations of a workflow 400 for generating an application programming interface request based on sets of interaction data according to some examples of the present disclosure. In FIG. 4A, the workflow 400 can involve an iterative process 401 that can involve receiving images 108 from a mobile application 302 and retrieving image data from the images 108. For example, for each interaction, a mobile application 302 can transmit at least one image 108 to an express application programming interface 304, the at least one image corresponding to a front of a document and a back of a document. The express application programming interface 304 can transmit the image(s) 108 to an integration tool 308 that can create a record therefrom. The integration tool 308 can transmit the image(s) 108 to an image processor 310 that can extract interaction data from the image(s) 108. The image processor 310 can transmit a notification to the integration tool that the interaction data 110 has been successfully extracted from the image(s) 108. This iterative process 401 can be repeated for each interaction 106 until the interaction data 110 corresponding to each interaction 106 has been captured. In some examples, the iterative process 401 can involve transmitting the interaction data 110 from the integration tool 308 to the passport system 312 to determine that the interaction data 110 does not correspond to a duplicate interaction. In some examples, if the passport system 312 determines that the interaction data 110 does correspond to a duplicate interaction (e.g., an interaction that has already been processed by the entity server or whose interaction data has already been extracted from the image(s)), the passport system 312 may generate an error message. The passport system 312 can transmit the error message to the mobile device for indicating to a user of the mobile device that the interaction data 110 corresponds to a duplicate interaction.

Referring now to FIG. 4B, the workflow 400 can include a non-iterative process 403 that can involve submitting each set of interaction data 110 to the entity server 316 for processing. The mobile application 302 can transmit a request to the integration tool 308 for retrieving the interaction data from the image processor 310. The integration tool 308 can, as part of the non-iterative process 403, retrieve the interaction data from the image processor 310. Upon retrieving the interaction data, the integration tool 308 can build an application programming interface request from the interaction data 110, and transmit the application programming interface request to the passport system 312. The passport system 312 can process the application programming interface request and transmit the interaction data to the transaction gateway 314. The transaction gateway 314 can generate a file based on the interaction data 110 and transmit the file to the entity server 316. In some examples, generating the file can include adding sets of interaction data 110 to the file until a pre-defined batch size is reached. In response to the entity server 316 processing the interaction data 110 in the file, the transaction gateway 314 can transmit a notification to the mobile application indicating that the interaction data 110 for the set of interactions has been processed by the entity server 316.

Figure 5:
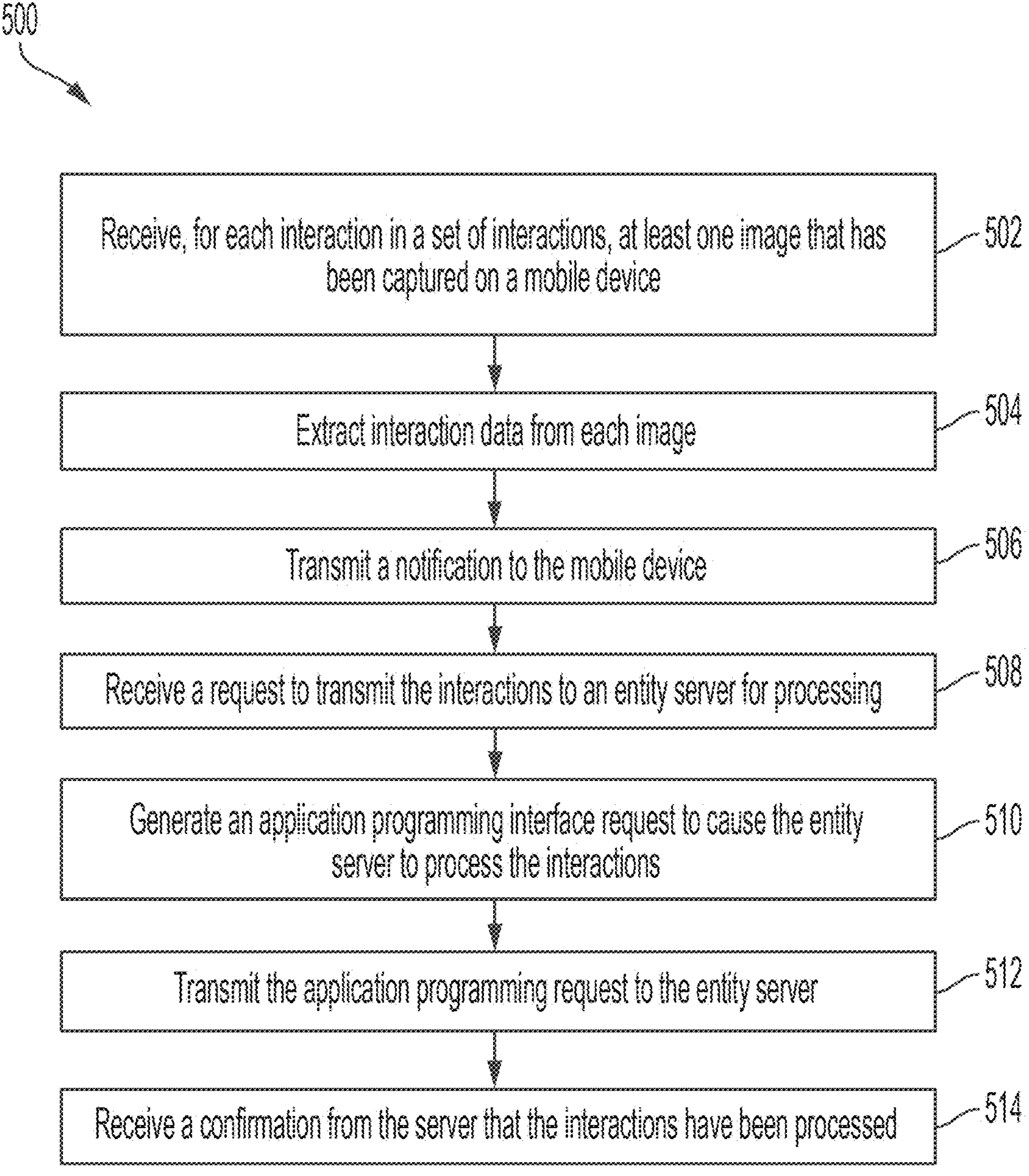
FIG. 5 is an illustration of a process for generating an application programming interface request based on sets of interaction data according to some examples of the present disclosure.

FIG. 5 is an illustration of a process 500 for generating an application programming interface request based on sets of interaction data according to some examples of the present disclosure.

At block 502 the at least one processor 102 receives, from a mobile application executing on a mobile device, and for each interaction in a set of interactions, at least one image that has been captured on the mobile device and corresponds to an interaction. The mobile application can be a mobile banking application that can enable a user of the mobile application to use the mobile device to retrieve images from one or more documents corresponding to one or more interactions. In some examples, the documents can be checks, and the images can include front-facing portions and rear-facing portions of the checks.

At block 504, the at least one processor 102 extracts, for each interaction in the set of interactions, interaction data from each image. The interaction data can include values associated with the interaction, magnetic ink character recognition data associated with the interaction, or any other suitable data associated with the interaction. The magnetic ink character recognition data can include identifying information that can be used to associate the interaction to a corresponding account that the interaction may be associated with.

At block 506, the at least one processor 102 transmits, for each interaction in the set of interactions, a notification to the mobile device indicating that the interaction data has been extracted from the images. The notification can include identifiers for each set of interaction data to indicate which interaction each set of interaction data corresponds to. The mobile device may prompt the user to proceed before transmitting the interactions to an entity server for processing.

At block 508, the at least one processor 102 receives a request to transmit the set of interactions to an entity server for processing. The entity server can be a server corresponding to a clearing house or bank. The request can be received from the mobile device. In some examples, the mobile device can transmit the request in response to receiving user input. In other examples, the request can be generated automatically by the mobile device or by the at least one processor 102.

At block 510, the at least one processor 102 generates, based on the interaction data, an application programming interface request that is configured to cause the entity server to process the set of interactions. The application programming interface request can include the interaction data, as well as any other suitable data for enabling the entity server to process the interactions.

At block 512, the at least one processor 102 transmits the application programming interface request to the entity server. The application programming interface request can include a file, such as an X9 file. The at least one processor 102 can build the file by adding sets of interaction data to the file. In some examples, the at least one processor 102 can add sets of interaction data to the file until the file reaches a certain size or until the amount of sets of interaction data present in the file match a pre-defined batch limit.

At block 514, the at least one processor 102 receives a confirmation from the entity server that the set of interactions have been processed by the entity server. The confirmation can include a set of identifiers that correspond to the interactions that have been processed by the entity server. For example, each interaction can have a corresponding identifier for indicating to a user of the mobile device that the interaction has been processed.

In some examples, each process in the figures of this disclosure can be performed by one or more processing units. A processing unit may include one or more processors, including single core or multicore processors, one or more cores of processors, or combinations thereof. In some examples, a processing unit can include one or more special purpose co-processors such as graphics processors, Digital Signal Processors (DSPs), or the like. In some examples, some or most of the processing units can be implemented using customized circuits, such as Application Specific Integrated Circuits (ASICs), or Field programmable gate arrays (FPGAs).

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer-implemented method comprising:

receiving, by at least one processor from a mobile application executing on a mobile device and for each interaction in a plurality of interactions, at least one image that has been captured on the mobile device and corresponds to an interaction;

extracting, by the at least one processor and for each interaction in the plurality of interactions, interaction data from each image;

determining, by the at least one processor and prior to transmitting an application programming interface request to an entity server, that a number of interactions in the plurality of interactions matches an expected number of interactions;

determining, by the at least one processor and prior to transmitting the application programming interface request to the entity server, that a plurality of values associated with the plurality of interactions matches a plurality of expected values;

transmitting, by the at least one processor, the application programming interface request that is configured to cause the entity server to process the plurality of interactions to the entity server; and receiving, by the at least one processor, a confirmation from the entity server that the plurality of interactions have been processed by the entity server.

2. The computer-implemented method of claim 1, wherein extracting the interaction data from the at least one image comprises:

extracting, by the at least one processor, magnetic ink character recognition data from a region of the image.

3. The computer-implemented method of claim 1, wherein receiving the confirmation from the entity server that the plurality of interactions have been processed by the entity server further comprises receiving a plurality of interaction identifiers corresponding to the plurality of interactions, wherein each interaction identifier corresponds to a processed interaction.

4. The computer-implemented method of claim 1, wherein generating the application programming interface request further comprises:

generating, for each interaction, at least one file from the at least one image, wherein the at least one file includes:

a front-facing image of a document that corresponds to the interaction and has been scanned by the mobile device;

a rear-facing image of the document that corresponds to the interaction and that has been scanned by the mobile device; and metadata associated with the interaction.

5. The computer-implemented method of claim 4, wherein the application programming interface request is generated in response to determining that a number of interactions in the plurality of interactions is equal to a pre-defined number of interactions.

6. The computer-implemented method of claim 1, further comprising:

generating, by the at least one processor and for each interaction in the plurality of interactions, a record associated with the interaction that is configured to associate the interaction with a user account corresponding to a user of the mobile device.

7. A computing system comprising:

at least one processor; and a memory comprising instructions that are executable by the at least one processor for causing the at least one processor to:

receive, from a mobile application executing on a mobile device and for each interaction in a plurality of interactions, at least one image that has been captured on the mobile device and corresponds to an interaction;

extract, for each interaction in the plurality of interactions, interaction data from each image;

determine, prior to transmitting an application programming interface request to an entity server, that a number of interactions in the plurality of interactions matches an expected number of interactions;

determine, prior to transmitting the application programming interface request to the entity server, that a plurality of values associated with the plurality of interactions matches a plurality of expected values;

transmit the application programming interface request that is configured to cause the entity server to process the plurality of interactions to the entity server; and receive a confirmation from the entity server that the plurality of interactions have been processed by the entity server.

8. The computing system of claim 7, wherein extracting the interaction data from the at least one image comprises:

extracting, by the at least one processor, magnetic ink character recognition data from a region of the image.

9. The computing system of claim 7, wherein receiving the confirmation from the entity server that the plurality of interactions have been processed by the entity server further comprises receiving a plurality of interaction identifiers corresponding to the plurality of interactions, wherein each interaction identifier corresponds to a processed interaction.

10. The computing system of claim 7, wherein generating the application programming interface request further comprises:

generating, for each interaction, at least one file from the at least one image, wherein the at least one file includes:

a front-facing image of a document that corresponds to the interaction and has been scanned by the mobile device;

a rear-facing image of the document that corresponds to the interaction and that has been scanned by the mobile device; and metadata associated with the interaction.

11. The computing system of claim 10, wherein the application programming interface request is generatable in response to determining that a number of interactions in the plurality of interactions is equal to a pre-defined number of interactions.

12. The computing system of claim 7, wherein the instructions are further executable by the at least one processor for causing the at least one processor to:

generate, for each interaction in the plurality of interactions, a record associated with the interaction that is configured to associate the record with a user account corresponding to a user of the mobile device.

13. A non-transitory computer-readable medium comprising instructions that are executable by at least one processor for causing the at least one processor to:

receive, from a mobile application executing on a mobile device and for each interaction in a plurality of interactions, at least one image that has been captured on the mobile device and corresponds to an interaction;

extract, for each interaction in the plurality of interactions, interaction data from each image;

determine, prior to transmitting an application programming interface request to an entity server, that a number of interactions in the plurality of interactions matches an expected number of interactions;

determine, prior to transmitting the application programming interface request to the entity server, that a plurality of values associated with the plurality of interactions matches a plurality of expected values;

transmit the application programming interface request that is configured to cause the entity server to process the plurality of interactions to the entity server; and receive a confirmation from the entity server that the plurality of interactions have been processed by the entity server.

14. The non-transitory computer-readable medium of claim 13, wherein extracting the interaction data from the at least one image comprises:

extracting, by the at least one processor, magnetic ink character recognition data from a region of the image.

15. The non-transitory computer-readable medium of claim 13, wherein receiving the confirmation from the entity server that the plurality of interactions have been processed by the entity server further comprises receiving a plurality of interaction identifiers corresponding to the plurality of interactions, wherein each interaction identifier corresponds to a processed interaction.

16. The non-transitory computer-readable medium of claim 13, wherein generating the application programming interface request further comprises:

generating, for each interaction, at least one file from the at least one image, wherein the at least one file includes:

a front-facing image of a document that corresponds to the interaction and has been scanned by the mobile device;

a rear-facing image of the document that corresponds to the interaction and that has been scanned by the mobile device; and metadata associated with the interaction.

17. The non-transitory computer-readable medium of claim 16, wherein the application programming interface request is generatable in response to determining that a number of interactions in the plurality of interactions is equal to a pre-defined number of interactions.

* * * * *